UNITED STATES PATENT OFFICE.

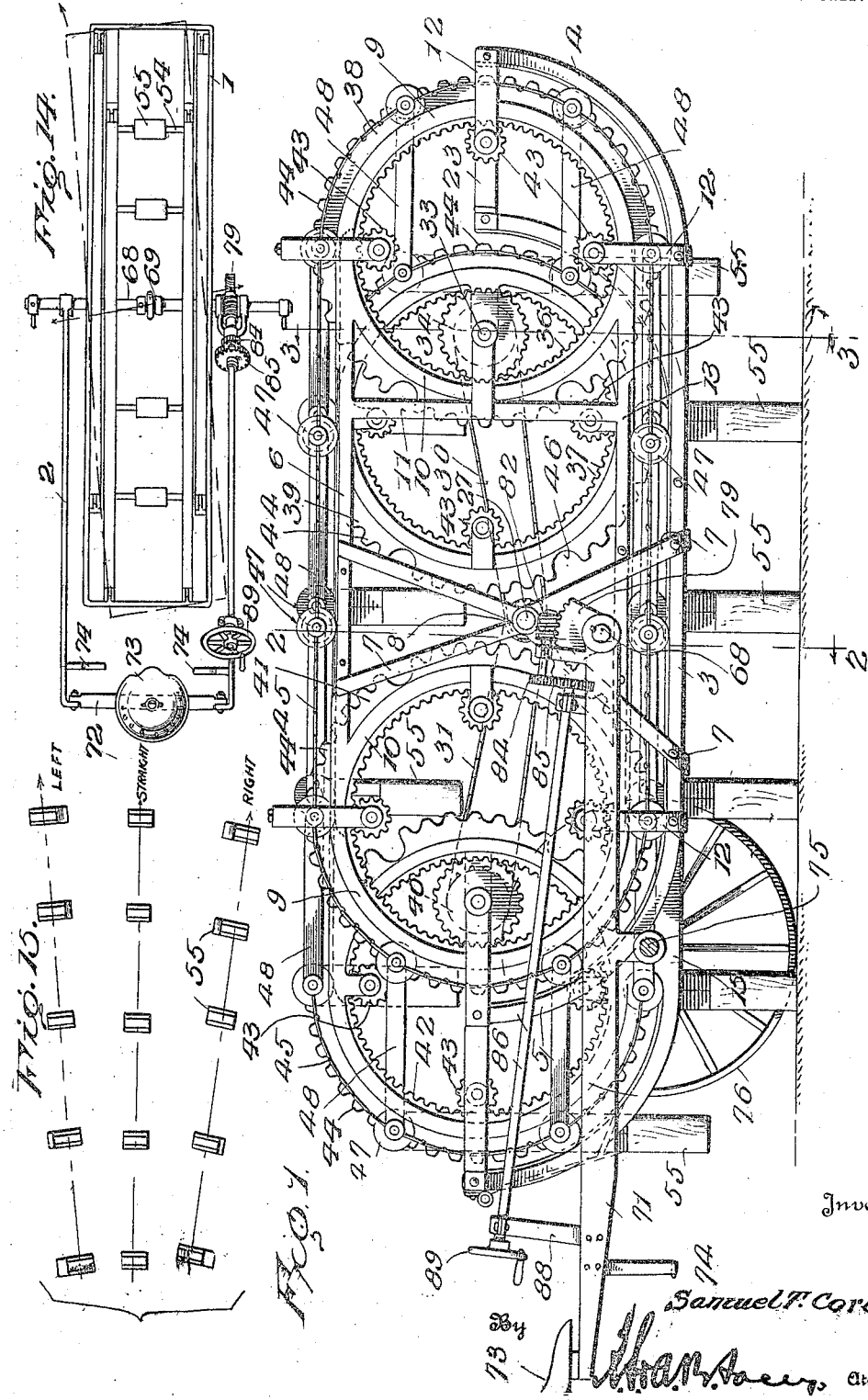

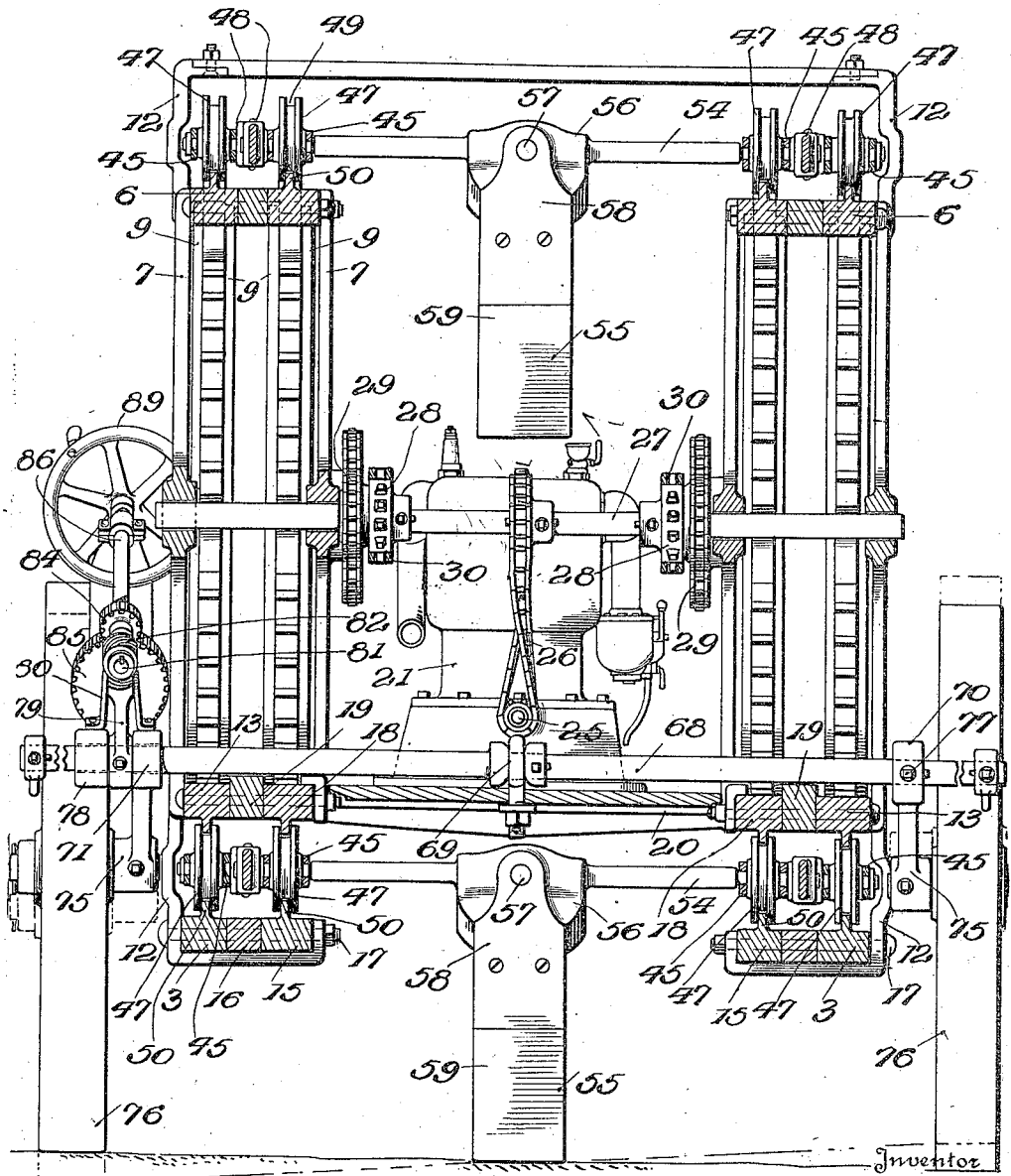

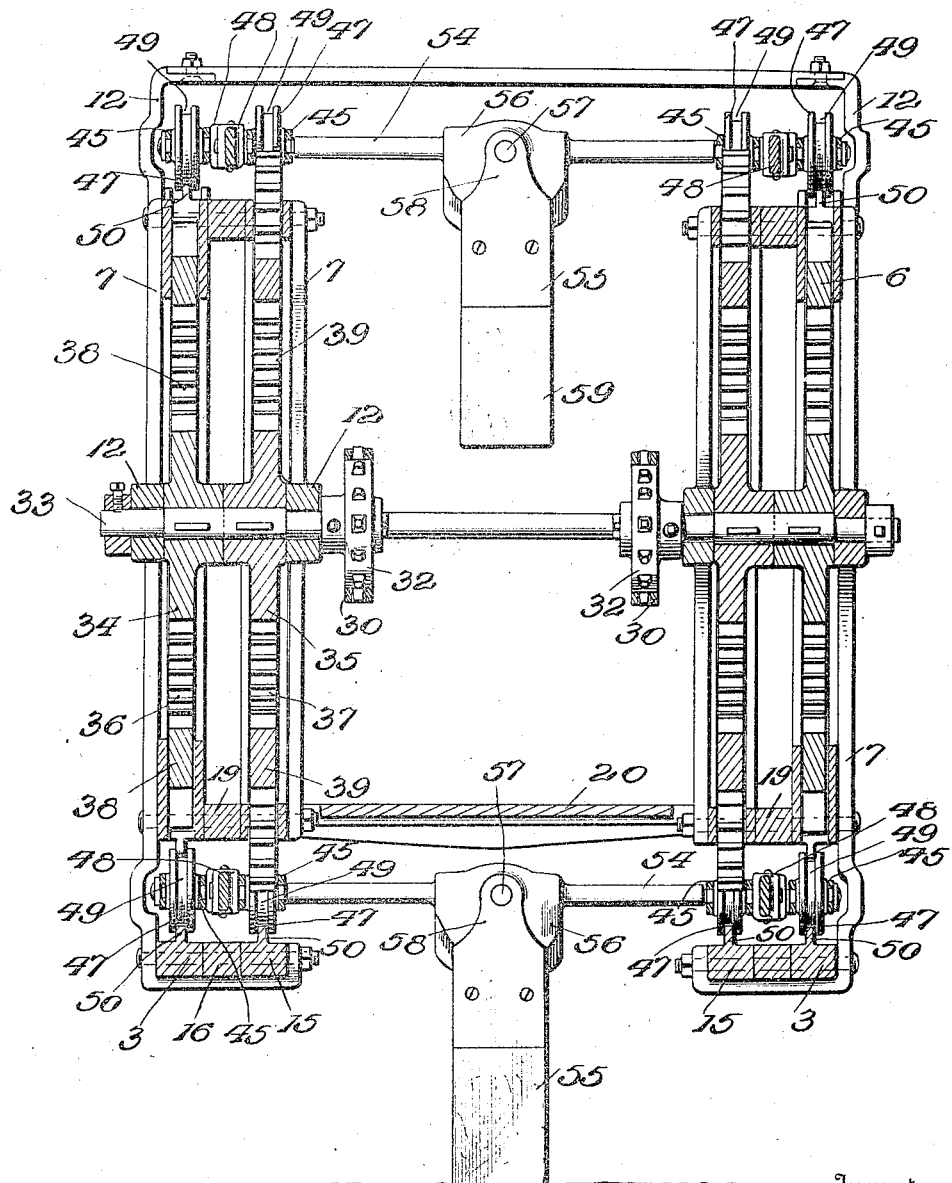

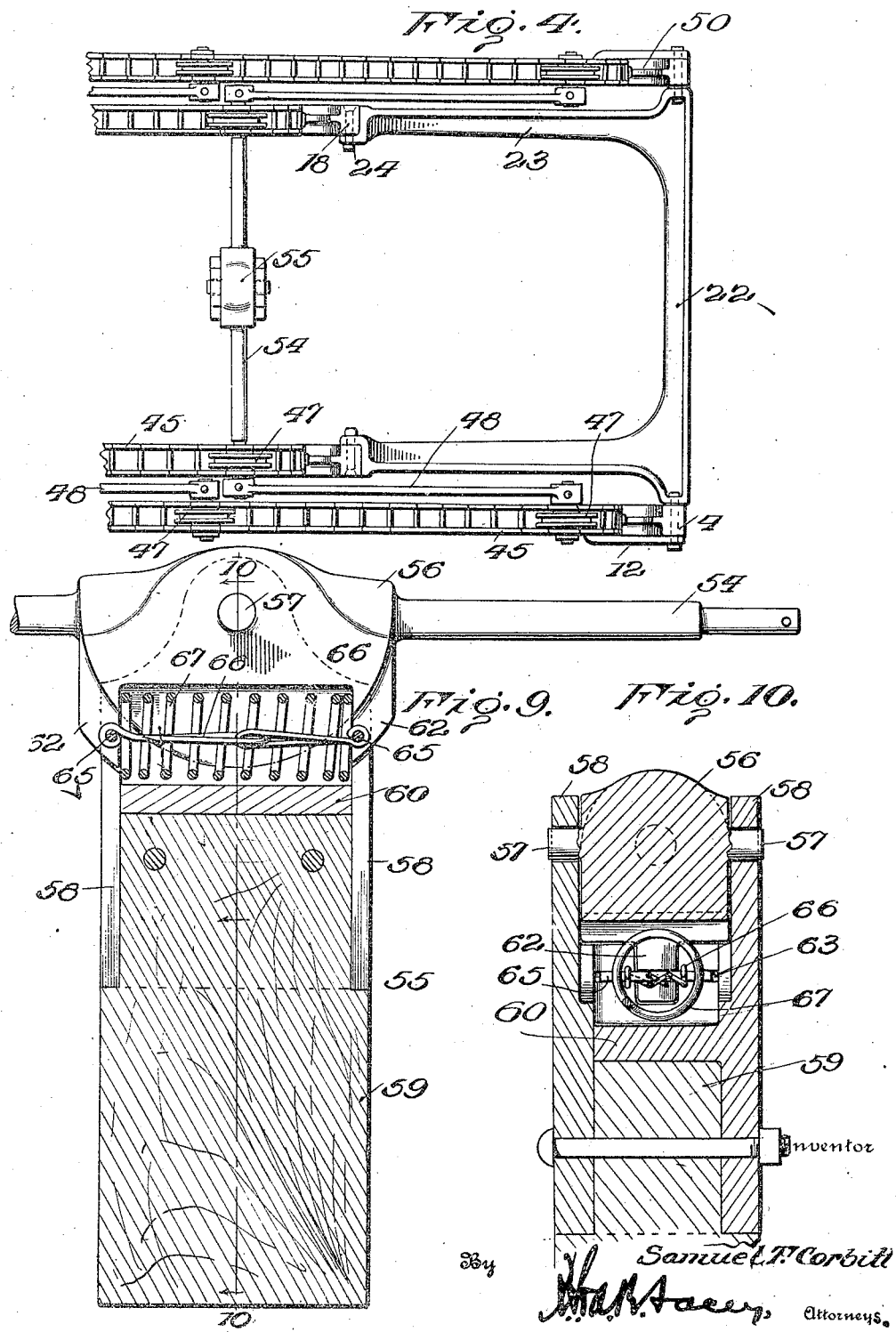

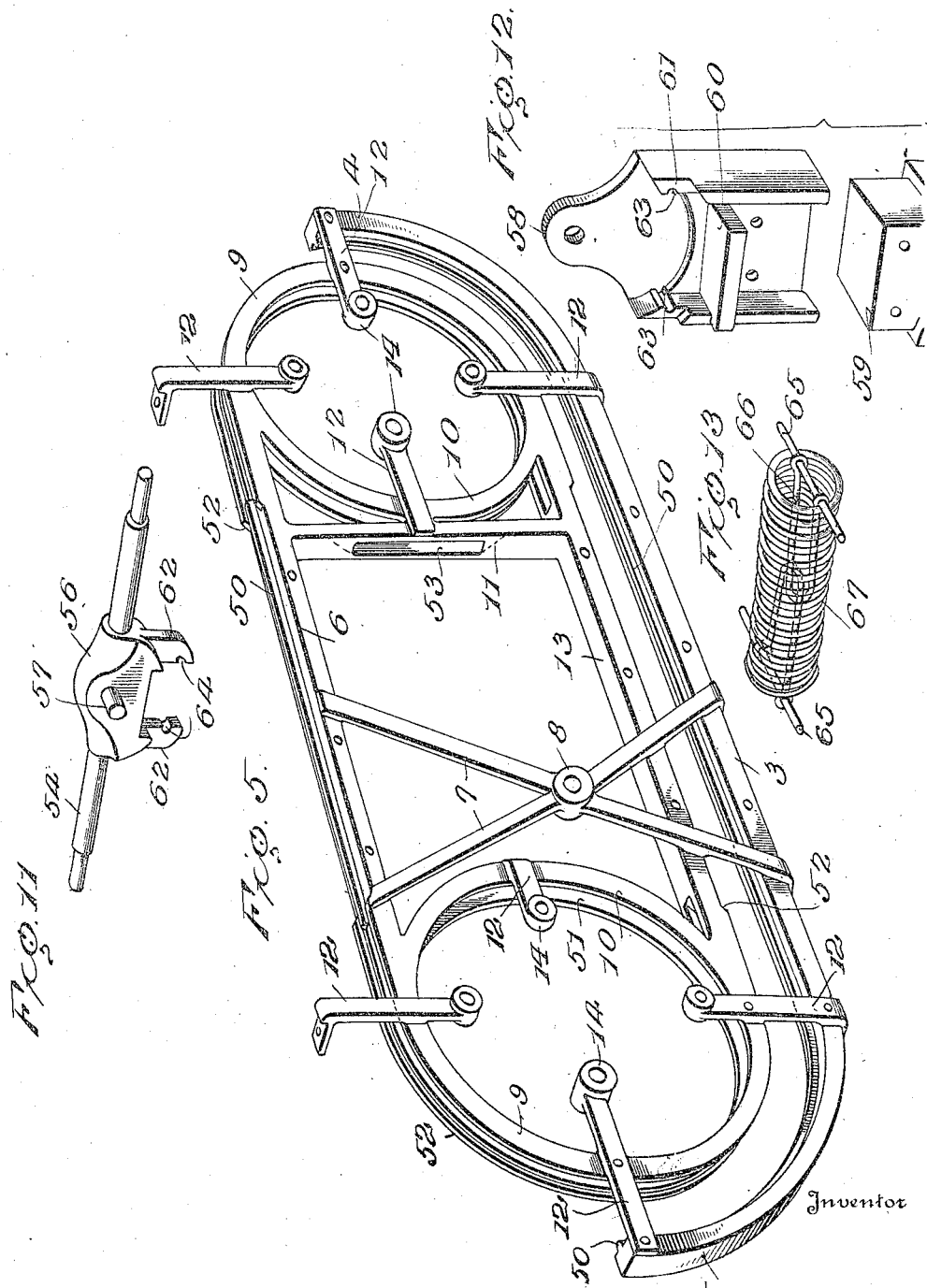

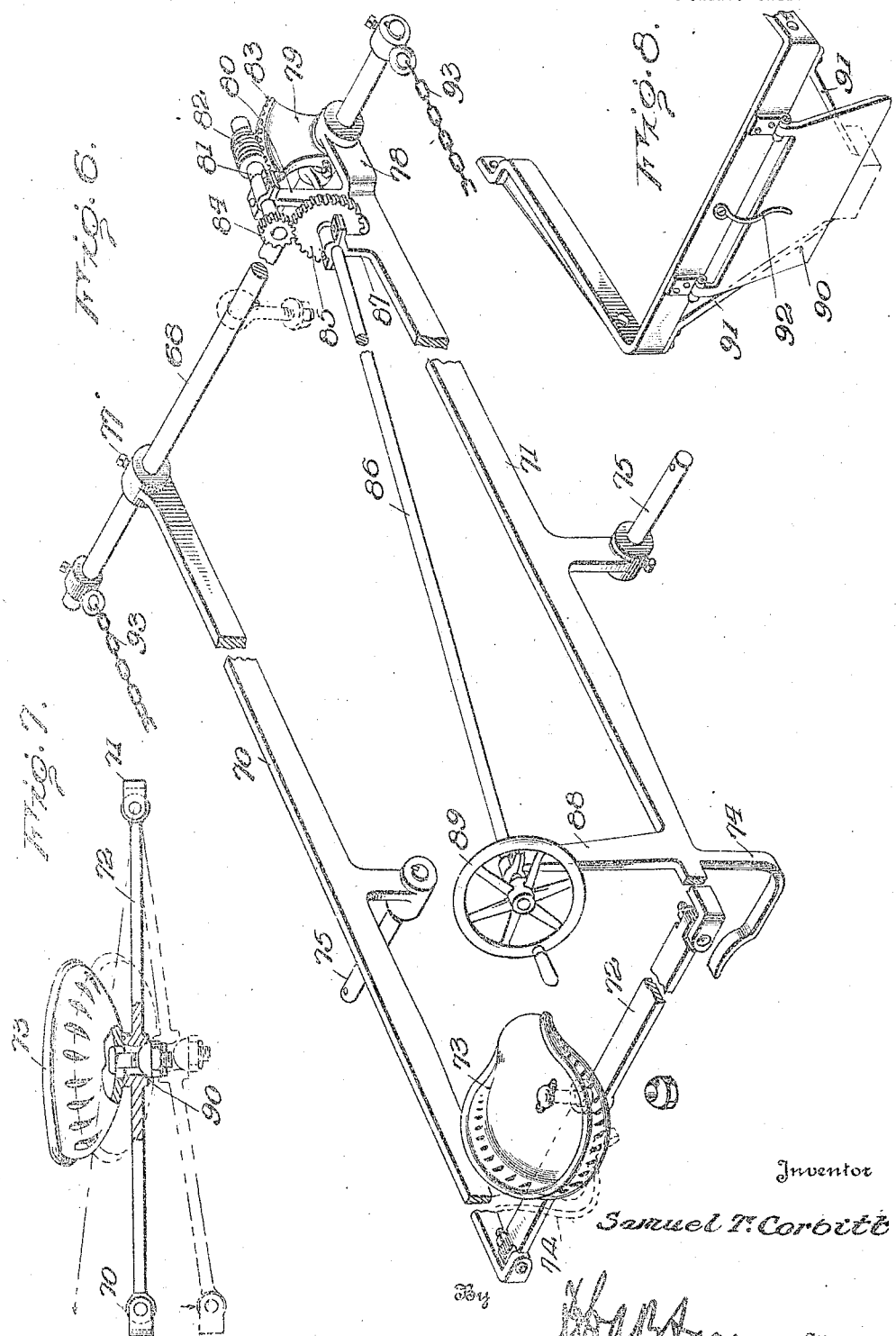

SAMUEL T. CORBITT, OF ENID, OKLAHOMA.

TRACTOR.

1,287,643.   Specification of Letters Patent.   Patented Dec. 17, 1918.

Application filed December 12, 1917. Serial No. 206,809.

*To all whom it may concern:*

Be it known that I, SAMUEL T. CORBITT, a citizen of the United States, residing at Enid, in the county of Garfield and State of Oklahoma, have invented certain new and useful Improvements in Tractors, of which the following is a specification.

My invention relates to tractors and has for its object the provision of a tractor which will be compact in the arrangement of its parts and capable of use for drawing agricultural implements over a field. The invention seeks to provide a tractor which may be readily steered and which will maintain its equilibrium under all conditions and notwithstanding any irregularities or variations in the surface of the ground. The invention also seeks to provide a device which may be easily driven and which will be capable of resisting high strains.

The invention is illustrated in the accompanying drawings and consists in certain novel features which will be hereinafter first fully described and then more particularly pointed out in the appended claims.

In the annexed drawings:

Figure 1 is a side elevation of a tractor embodying my improvements;

Fig. 2 is a transverse view on the line 2—2 of Fig. 1;

Fig. 3 is a transverse section on the line 3—3 of Fig 1;

Fig. 4 is a plan view of the forward end of the tractor;

Fig. 5 is a detail perspective view of one of the side frames;

Fig. 6 is a detail perspective view of the frame upon which the operator rides and upon which the ground wheels are mounted;

Fig. 7 is a detail view of the seat and its mounting;

Fig. 8 is a detail perspective view of the rear end of the main frame showing scrapers mounted thereon for relieving the propelling feet of accumulated mud or dirt;

Fig. 9 is an enlarged transverse section of one of the said propelling feet;

Fig. 10 is a detail section on the line 10—10 of Fig. 9;

Fig. 11 is a detail perspective view of the support for the propelling feet;

Fig. 12 is a detail perspective view of the upper portion of a propelling foot;

Fig. 13 is a detail perspective view of a spring or cushion which is provided at the head of the propelling foot;

Fig. 14 is a diagrammatic plan view showing the method of steering the tractor;

Fig. 15 is a diagrammatic view showing the position assumed by the propelling feet in the steering of the tractor.

In carrying out my invention, I employ a main frame consisting of similar side members and transverse connecting members at the front and rear ends of said side members. Pivotally connected with the main frame thus constructed is a rearwardly extending riding frame upon which the operator is seated and which is provided with wheels to run on the ground. In Fig. 14 the main frame is designated by the reference numeral 1 and the riding frame by the reference numeral 2. The side members of the main frame consist of a lower track 3 having arcuate upturned front and rear ends 4 and 5 and an upper track 6 which is connected with the lower track by braces 7 disposed obliquely so as to intersect and provide at their point of intersection a bearing 8 for the driving shaft. The ends of the upper track 6 merge into semicircular members 9 which in their lower portions are concentric with and spaced from the upturned ends 4 and 5 of the lower track. Semi-circular bracing and supporting members 10 are disposed adjacent the ends of the track 6 and form continuations of the semi-circular members 9 so that a complete circular support is provided for a combined sprocket and internal gear wheel which forms a part of the propelling mechanism. In Fig 5, the braces 7 are nearer the rear end of the frame and the forward end of the frame, therefore, needs additional bracing which is provided by an upright 11 disposed adjacent the forward arcuate bracing member 10. Supporting and securing arms 12 are provided at each end portion of the side frame and these securing and supporting arms serve to connect and brace the lower track and the upper portion of the frame, a beam or longitudinal bar 13 extending between the lower portions of the circular end supporting members. The inner ends of the arms 12 project inwardly beyond the circular or supporting members and are provided with bearings 14 to receive the shafts or axles of supporting and driving pinions. Two of these side frames and tracks are provided at each side of the machine, the tracks and frames at each side being disposed in spaced parallel relation and the outer track being set somewhat in advance of the inner track as shown most clearly in Fig. 4. Between the lower track 3 and the inner lower track 15, I arrange longitudinal spacing bars 16 and the lower ends of the lower supporting arms 12 are turned inwardly so as to pass under the said tracks and spacing beams and have their inward extremities turned up to bear against the inner sides of the inner tracks, securing bolts 17 being inserted through the arms 12 and the inner upturned extremities thereof and through the tracks and spacing bar to rigidly secure the several parts together. The tracks will thus be properly supported and will be firmly held in the proper parallel spaced relation. The beam 13 constitutes an upper track for the outer frame and a similar beam 18 on the inner frame is held in parallel spaced relation with the beam 13 by a longitudinal spacing bar 19 secured between them while a platform 20 is secured to the inner side of each beam 18 and extends between the same to support an engine 21 which furnishes the motive power for the tractor.

The extremities of the outer tracks and side frames are connected by a transverse beam or brace 22 which is rigidly secured to the extremities of the frames and near its ends is provided with the longitudinal arms 23 which extend past the extremities of the frames in the same longitudinal planes as the inner frames and have their inner extremities secured to the extremities of the said inner frames as shown at 24 in Fig. 4. It will be readily understood that the circular members 9 and 10, the tracks or beams 6 and 13 and the several braces and supporting arms 12 as well as the lower track 3 may be formed as one integral structure and in actual practice will generally be so made.

The driving shaft 25 is connected by any suitable gearing, preferably sprocket gearing 26 with a transmission shaft 27 which is journaled in the bearings 8 of the side frames and upon the said transmission shaft adjacent the inner bearings, I secure the sprocket pinions 28 and 29 around which chains 30 and 31 are respectively trained. The chains 30 extend forwardly and the chains 31 extend rearwardly. The chains 30 are trained around sprocket wheels 32 secured upon the inner ends of shafts 33 which are journaled in the supporting arms 12 projecting from the uprights 11 and upon the said shaft between the inner and outer frames I secure the pinions 34 and 35 which mesh respectively with the internal gears 36 and 37 of the combined gear and sprocket wheels 38 and 39. By a duplicate arrangement the sprocket chain 31 actuates pinions 40 to drive the rear gear and sprocket wheels 41 and 42 so that the power of the engine is applied to the propelling mechanism at both the front and rear of the tractor. Idler pinions 43 are carried by the several supporting arms 12 other than those supporting the driving pinions 34, 35, and 40 so that the combined gear and sprocket wheels will be properly supported and maintained truly centered. The external periphery of the wheels 38, 39, 41, and 42 are provided with sprocket teeth 44 which are engaged by the driving sprocket chains 45 and at regular intervals in said external peripheries are enlarged notches or recesses 46 which are adapted to receive the pulleys 47 occurring at regular intervals in the said chains. The pulleys 47 are disposed at the front and rear ends of links 48 and the several parts are so arranged that the pulley at the front end of each link will be connected to the outer forward sprocket chain and will, of course, ride in the sockets or recesses in the outer sprockets while the pulleys at the rear ends of the several links will ride in the sockets or recesses of the inner sprockets and will be connected to the inner chains, the several links being thus maintained in a horizontal position at every point of the operation and notwithstanding any shifting in their location relative to the sprockets. A steady pull is thus exerted through all the links so as to effect a forward travel of the tractor. The pulleys are all provided with annular grooves 49 midway their ends so that they may engage the central longitudinal ribs 50 of the several tracks. The circular end portions of the side frames are intended to fit against the opposite sides of the combined gear and sprocket wheels and to this end they must, of course, be slotted or composed of spaced members to accommodate the said gear and sprocket wheels. In Fig. 5, the space between the side members is indicated by the reference numeral 51 and it will be noted that the outer periphery faces of these members form continuations of the surfaces of the track members 6 and 13, as shown at the extreme left in said figure, while the side edge portions of the members 9 and 10 are projected annularly to provide guides which by projecting up at the ends of the pulleys will constitute guides for the same to prevent lateral movement thereof and consequent shifting of the same from the desired line of travel. As shown most clearly in Fig. 5, the side flanges 52 have their ends carried beyond the ends of the ribs 50 so that at no point in the travel of the pulleys will they be without a guiding track. It will also be noted that the uprights 11 are provided with longitudinal slots 53 to accommodate the periphery of the combined sprocket and gear wheels.

The rollers or pulleys 47 are so disposed that each pulley at the rear end of a link 48 will be in the same transverse plane of the tractor as a corresponding pulley at the opposite side of the machine and will be connected with said pulley by a cross-bar or rod 54, a plurality or chain of these cross-bars being consequently provided which extends longitudinally of the machine between the sides thereof and upon each of said cross-bars is hung a propelling foot 55. It will now be readily understood that the motion of the engine shaft will be transmitted through the described gearing to the cross-bars or axles 54 so that they will tend to travel longitudinally upon the said frames, moving forwardly along the upper tracks and rearwardly along the lower tracks. The several propelling feet 55 are hung upon the respective axles or cross-bars 54 so that they will always depend vertically therefrom and, consequently, as they reach the lower portion of the side frame they will rest upon the surface of the ground and form fulcrums or tracks upon which the machine may move forward. The actual operation is to cause the said frames to move forwardly upon and over the several propelling feet as fulcrums and as the machine moves forwardly the feet are successively lifted from the ground and caused to travel relatively forward over the tractor frame and assume positions under the front end thereof so that the machine will travel forwardly in the manner commonly designated "caterpillar."

Each propeller foot comprises a head or stock member 56 which is secured rigidly to or formed upon the cross-bar or axle 54 and is provided upon its front and rear sides with trunnions 57 upon which the upper bifurcated end or yoke 58 of the foot is pivotally hung. The yoke 58 will preferably be cast metal so as to possess the desired strength and durability and the lower portion or leg of the propelling foot may be a wooden block 59 secured rigidly in the lower portion of the yoke below a transverse web 60 therein, this construction decreasing the weight of the machine, as well as the cost thereof. The upper portion of the foot, which has been designated as a yoke or bifurcation, is provided with central notches or recesses 61 adapted to fit around the depending spurs or teeth 62 at the sides of the stock 56 and in the inner faces of the side portions of the yoke and the said spurs or teeth are grooves or notches 63 and 64 to receive pins 65 which have interengaging links 66 extending therefrom. A spring or buffer 67 is coiled around the interengaging links between the said pins and is housed within the yoke and the said stock as shown clearly in Figs. 9 and 10. Inasmuch as the extremities of the yoke fit against flat front and rear faces of the stock 56, as shown most clearly in Fig. 10, the propelling foot can not move relative to the stock longitudinally of the tractor but inasmuch as the foot is pivotally hung upon the trunnions 57 it may be swung transversely of the tractor and this adaptability of the propelling feet is utilized in the steering of the machine.

The tractor frame is connected with the front bar or axle 68 of the riding frame by a swivel connection of any preferable detailed structure, indicated at 69, so that the tractor frame may be moved freely in any direction relative to the riding frame. When it is desired to direct the tractor from its travel along a straight path the operator, who is seated in rear of the tractor frame, merely reaches forward and by grasping the rear end of the tractor frame swings it to either side so that its opposite ends will swing in opposite directions about the connection 69 as a center, as indicated by dotted lines in Fig. 14. As a result of this lateral shifting of the tractor frame, the several propelling feet which are in contact with the ground will be caused to move out of vertical positions inasmuch as their lower ends will be held against lateral movement by their engagement with the ground and their upper ends will necessarily follow the movement of the tractor frame. This shifting of the propelling feet is clearly illustrated in the diagrammatic Fig. 15. It will thus be seen that the tractor frame has a more or less flexible support upon the ground so that it may be readily turned within a small space and the steering operation will entail no onerous labor upon the part of the operator.

The riding frame comprises side bars 70 and 71 which are fitted at their front ends upon the cross-bar or axle 68 and are connected at their rear ends by a cross-bar or beam 72 having its ends pivoted or hinged to the ends of the side bars. A driver's seat 73 is carried by the cross-bar or beam 72 and foot rests 74 are provided adjacent the rear extremities of the side bars and depend therefrom while intermediate the ends of the side bars are stub axles 75 upon which the ground wheels 76 are mounted. The front end of the side bar 70 is clamped or otherwise firmly secured to the cross-bar or axle 68, a set screw 77 being illustrated in the present drawings. The front end of the side bar 71, however, is loosely fitted upon the axle or cross-bar 68 and is in the form of a yoke shown at 78 and between the members of this yoke a segment 79 is secured upon the axle. A pedestal 80 rises from the base of the yoke 78 and in the upper end of said pedestal is journaled a shaft 81 provided at its front end with a worm 82 meshing with the toothed arcuate edge 83 of the segment 79. At the rear end of the shaft 81 is a pinion 84 meshing with a gear wheel 85 provided upon the front end of a leveling rod 86 which is journaled in a bearing 87 upon the side bar 71 adjacent the yoke 78. The rear end of the rod 86 is supported by a post or standard 88 rising from the side bar 71 near the rear end thereof and upon the said rear end of the rod 86 is a hand wheel 89. It will be readily understood that if the hand wheel 89 be rotated in one or the other direction, the rotation thereof will be transmitted directly to the rod 86 and through the described gearing to the worm 82 which will be caused to ride over the segment 79. As a result of this action, the side bar 71 will swing upwardly or downwardly about the axle 68 as a center and inasmuch as the side bar 70 is fixed relative to the axle there will be a bending or twisting of the riding frame so that one of the ground wheels 76 will move upwardly or downwardly relative to the other wheel. The operator is thus enabled to keep the riding frame level notwithstanding any irregularities in the surface of the ground as will be readily understood upon reference to Fig. 2. This flexibility of the apparatus will also aid in keeping the engine level at all times inasmuch as the propelling feet will tend to sink slightly into the surface of the ground which is generally soft enough to give the necessary purchase to the entire lower surface of the foot.

The driver's seat 73 is secured upon the cross-bar or beam 72 at the center thereof and has a swiveled universal connection, as indicated at 90, so that whatever inclination may be assumed by the said cross-bar the seat will remain level and the operator will not be thrown to one side.

The several propelling feet will, of course, tend to take up more or less mud and dirt and to relieve them of this accumulation, I provide scrapers 90 and 91 at the rear end of the tractor frame which are arranged to engage the sides of the propeller foot as it rises from the ground, the scrapers being held to the path of the propeller foot by weak springs 92 secured to the frame and bearing against the outer sides of the plates, the plates being hinged or pivoted to the frame in any convenient manner. It will be readily understood that the springs have only sufficient strength to hold the scrapers to the propeller feet and that as a foot rises from the ground it will pass into the space between the several scrapers so that it will be automatically engaged thereby.

From the foregoing description taken in connection with the accompanying drawings, it will be seen that I have provided a very compact tractor which may be readily steered and which may be propelled under light power. To the ends of the cross-bar or axle 68 I secure draft devices 93 which may be used to couple a plow or cultivator to the tractor so that the tractor may draw the said implement over a field as will be readily understood and the flexibility of the tractor apparatus will permit it to travel over irregularities in the ground without drawing the implement from its path and decreasing the effectiveness of the same. Inasmuch as the tractor frame has a universal connection with the front end of the riding frame it may be easily turned from side to side so as to be properly steered and is also capable of movement in a vertical plane about the said axle or rod as a center so that if the advance propelling feet should encounter a rising stretch of ground, the tractor frame will accommodate itself to said rise without causing the ground wheels 76 to leave the ground and likewise if the propelling feet should reach a down grade in advance of the ground wheel 76 the tractor frame may swing vertically about its pivotal support so as to accommodate the condition. Inasmuch as the propelling feet cannot swing longitudinally of the machine relative to the axle 54 by which they are carried they will not be permitted to bend or yield to their contact with the surface of the ground but will always approach the ground with their lower ends in a horizontal plane and consequently will always positively obtain the necessary purchase to drive the machine forward. The construction employed at the ends of the tractor frame imparts great strength and rigidity thereto while at the same time it assures the necessary relative arrangement of the tracks and furnishes a proper support for the same.

Having thus described the invention, what is claimed as new is:

1. An apparatus for the purpose set forth comprising a riding frame having side bars and a cross bar at the front end of the side bars, a tractor frame disposed between the side bars of the riding frame and projecting forwardly and rearwardly from said cross bar, and a universal connection between the tractor frame and the said cross bar whereby the tractor frame may move pivotally, vertically and horizontally relative to the riding frame.

2. In an apparatus for the purpose set forth, the combination of a tractor frame, a cross bar extending through the tractor frame at the center thereof, a connection between the said cross bar and the tractor frame, side bars having their front ends fitted upon said cross bar, a flexible connection between the rear ends of said side bars, and means for causing one of said side bars to move pivotally about the cross bar.

3. In an apparatus for the purpose set forth, the combination with a tractor frame, of a cross bar connected therewith and having its ends projecting beyond the sides thereof, side bars extending from said cross bar laterally beyond the tractor frame, one of said side bars having its front end rigidly secured to the cross bar and the other of said side bars having its front end loosely upon the cross bar, a hinged connection between the rear ends of the side bars, a member fixed to the cross bar adjacent the front end of the loosely mounted side bar, and gearing mounted on said side bar and operatively engaging said member whereby said side bar may be given a pivotal movement about the cross bar.

4. In an apparatus for the purpose set forth, the combination of a cross bar, a tractor frame connected therewith, side bars disposed at the sides of the tractor frame, one of said side bars having its front end rigidly secured to the cross bar and the other of said side bars having its front end loosely fitted on the cross bar, a beam extending between the rear ends of the side bars and having its ends hinged thereto, a segment secured to the cross bar adjacent the front end of the pivotally mounted side bar, a worm carried by said side bar and meshing with said segment, and means on the side bar for causing the worm to ride upon the segment whereby a pivotal movement will be imparted to the side bar.

5. In an apparatus for the purpose set forth, the combination of similar side frames, endless travelers mounted on said side frames, means for imparting movement to said travelers, propelling feet operatively connected with and depending freely from said travelers, and means for permitting said propelling feet to move pivotally transversely to the travelers.

6. In an apparatus for the purpose set forth, the combination of side frames comprising endless tracks arranged in pairs with one member of each pair in advance of the other member and side by side and parallel therewith, endless travelers mounted upon the said tracks, links connecting the said endless travelers, and propelling feet operatively connected with and carried by the rear ends of the said links, said feet being freely suspended for movement transverse to the travelers.

7. In an apparatus for the purpose set forth, the combination of a pair of endless tracks disposed in parallel spaced relation with the end of one track in advance of the adjacent end of the other track, combined sprocket and gear wheels mounted at the ends of each track, means engaging all of said sprocket and gear wheels to impart motion thereto, endless carriers mounted upon and carried by said wheels, links connecting said carriers, and propelling feet operatively connected with said links.

8. An apparatus for the purpose set forth comprising similar side frames each comprising duplicate track members, a platform supported by and between the lower portions of said side frames, a motor on said platform, endless travelers mounted upon the track members, gearing mounted upon the said track members and operatively connected with the motor for imparting motion to said endless carriers, links connecting the carriers, connections between the rear ends of corresponding links at the opposite sides of the frame, and propelling feet suspended from said connections.

9. In an apparatus for the purpose set forth, a side frame comprising upper and lower tracks connected at their ends by spaced circular members, the tracks being provided with central longitudinal ribs and the circular members having peripheral surfaces merging into the surfaces of the tracks, and radially disposed flanges the ends of which are spaced from and overlap the ends of the ribs on the tracks.

10. In an apparatus for the purpose set forth, a frame consisting of a track portion having upturned ends, upper and lower track portions connected by circular end members, the lower track portion being disposed parallel with and in spaced relation to the first-mentioned track and the said circular end members being disposed concentric with the upturned ends of said first-mentioned track portion, and braces connecting the several track members.

11. In an apparatus for the purpose set forth, the combination of a tractor, a riding frame comprising side members and a cross bar connecting the front ends of said side members and pivotally connected to the tractor, one of said side members being rigidly secured to the cross bar at its front end and the other of said side members being loosely mounted upon said cross bar, a beam having its ends pivotally connected to the rear ends of the said side members, and a seat mounted upon said beam and having a universal connection therewith.

12. In an apparatus for the purpose set forth, the combination of endless travelers, cross rods extending between and carried by said travelers, means for imparting motion to the travelers, trunnions projecting forwardly and rearwardly from said cross bars, and propelling feet pivotally suspended upon said trunnions.

13. In an apparatus for the purpose set forth the combination of spaced endless carriers, means for imparting motion to said carriers, cross bars disposed between and connected with said carriers, stocks on said cross bars, and propelling feet having forked upper ends pivotally suspended upon said stocks for movement in a transverse plane and held by said stocks against relative movement in a longitudinal plane.

14. In an apparatus for the purpose set forth, the combination of endless travelers, cross-bars connected with and extending between said travelers, stocks on said cross bars, propelling feet pivotally suspended upon said stocks, and means housed within the stocks and the propelling feet for normally maintaining the said feet against pivotal movement.

15. In an apparatus for the purpose set forth, the combination of endless travelers, cross bars connected with and extending between said travelers, stocks upon said cross bars, propelling feet pivotally mounted on said stocks for movement in a plane transverse to the travelers, and resilient means housed within the upper ends of the propelling feet and said stocks to hold the propelling feet against said pivotal movement.

16. In an apparatus for the purpose set forth, the combination of similar side frames, endless travelers mounted on said frames, means for imparting movement to said travelers, propelling feet operatively connected with said travelers and depending freely, means for permitting said propelling feet to move pivotally transversely to the travelers, and means for preventing said propelling feet moving longitudinally relative to the travelers.

In testimony whereof I affix my signature.

SAMUEL T. CORBITT.